United States Patent Office 2,910,489
Patented Oct. 27, 1959

2,910,489
ESTERIFICATION METHOD
George R. Bond, Jr., Paulsboro, N.J., assignor to Houdry Process Corporation, Wilmington, Del., a corporation of Delaware No Drawing. Application June 23, 1958
Serial No. 743,963
5 Claims. (Cl. 260—407)

This invention relates to a method of bringing about the formation of ester groups by the reaction of carboxylic acid groups and alcohol groups, and particularly to a method employing a superior catalyst for the esterification.

The prior art has recognized that materials having an acid reaction tended to favor the attainment of equilibrium among the participants in the reaction zone comprising an alcohol, an acid, the resulting ester, and water. The reactions involving esterification in the presence of an acid catalyst are generally conducted at temperatures significantly above the boiling point of water at the pressure employed. Some esterifications are conducted under vacuum in order to aid the removal of the water from the reaction mixture. A variety of side reactions can compete with the desired esterification reaction. For example, acids are capable of catalyzing the dehydration of alcohols to form ethers, the dehydration of acids to form acid anhydrides, the dehydration of alcohols to form olefins and the polymerization of olefins to form polyolefinic material. Various side reactions can bring about the formation of dark colored materials, which impair the quality of the resulting ester. Much effort has been made to achieve a highly selective catalysis of the desired esterification reaction at dilute catalyst concentrations, but the results with high boiling esters have been generally unsatisfactory either in product formation and/or purification.

Most esterification reactions are conducted on a batch basis instead of upon a continuous basis. A reasonable period of time is required for heating the reactants to the temperature at which the esterification reaction is conducted, and in some instances, the ester product must be cooled prior to the next step in the processing. In the few instances in which a continuous esterification plant has been operated, a catalyst effective in bringing about a complete esterification reaction within a very short period of time has been recognized as desirable. However, in batch esterification methods, there is little effort to reduce the esterification time to less than about 10 minutes because of the processing time necessarily involved in the steps of heating and/or cooling the reactants and/or products. Some industrial esterification reactions are conducted for long periods of time, such as 12 hours. The desiderata of a 10 minute esterification time has been extremely remote in a high proportion of the industrially conducted esterification reactions. Any method of reducing the esterification reaction to less than about one hour has been the goal in batch esterification research, and further reductions in esterification time have sometimes been less important than improving the quality (acid number, color, hydroxyl number, etc.) of the ester.

The esterification reaction is a reversible reaction, so that the ester resulting from the esterification reaction may have a measurable amount of unreacted acid, notwithstanding the efforts to remove water from the esterification reaction mixture.

The concentration of the unreacted acid in the ester is one of the important indices of the purity of the ester. This is usually expressed as "acid number," which is the mg. of KOH required to neutralize 1 g. of sample. Multi-functional acids are sometimes reacted with multi-functional alcohols to provide polyesters having a very high molecular weight, such as within the range from about 500 to 10,000. Such polyesters tend to be relatively viscous, and to proceed toward the completion of the esterification reaction relatively slowly. The problem of removing the catalyst from the viscous polyester has increased the difficulty of providing satisfactory catalyst for the preparation of polyesters. A considerable portion of the polyesters has been prepared without the action of a catalyst, and by the application of elevated temperature and/or vacuum for promoting the esterification reaction. Alcohols, such as hexyl alcohol, octyl alcohol, form relatively non-volatile esters, thereby permitting more ready removal of the water from the reaction mixture.

In accordance with the present invention an esterification reaction for the preparation of relatively non-volatile esters or polyesters is conducted by the reaction of a carboxylic acid and an alcohol having at least six carbon atoms in the presence of catalytic amounts of titanium dichloride diacetate. This salt is a known compound which has been prepared by various methods, such as that described in Wadington 2,670,363, in which preheated vapors of acetic acid and titanium tetrachloride are reacted at 136–150° C. This salt is distinguishable in many respects from the inorganic acids such as sulfuric acid, phosphoric acid, hydrobromic acid and other acids which have been employed as esterification catalysts. It may be postulated that there is formation of an intermediate titanium ester of the alcohol, which may play an important part in promoting the desired reaction, although the advantageous results of the present invention are not dependent in any way upon such a supposition. Titanium dichloride diacetate can be heated with ethyl hexanol until liberation of HCl and acetic acid has ceased, thereby forming a white powder which is readily soluble in water and which resists hydrolysis on boiling or prolonged standing and which may be such an ester.

The technical subject matter pertinent to the present invention can be further clarified by reference to descriptions of a series of chemical data, which are designated as examples.

*Example 1*

In a laboratory apparatus for esterification 142 g. of oleic acid (0.5 mol) were mixed with 130 g. 2-ethylhexanol (1 mol or an excess) and 0.5 g. of titanium dichloride diacetate and heated in the glass flask while the water was distilled from the reaction mixture. The volume of condensed water was observed as an approximate measure of the progress of the reaction, the observations being:

| Time, mins., after mixing | ° F. | Ml H$_2$O |
|---|---|---|
| 5 | 350 | 2.4 |
| 10 | 380 | 6.1 |
| 15 | 395 | 8.5 |
| 20 | 410 | 9.5 |
| 25 | 420 | 9.5 |
| 30 | 428 | 9.5 |
| 35 | 428 | 9.5 |

The unreacted alcohol was removed by steam distillation, providing 60.3 g. of recovered alcohol and 189 g. of ester. A small amount of insoluble residue (possibly hydrolyzed titanium salt) was observed during decantation of the product. The ester was analyzed for unreacted carboxylic groups, and 0.05 ml. of 0.130 normal alcoholic KOH neutralized a 2.056 g. sample, indicating an acid number of 0.16, an exceptionally low value. Moreover, the ester was not dark, but had a color number of 1.5 in the Union Colorimeter Color Scale, and thus was as light as the original acid. Analysis of the alcohol indicated that not more than 0.05% of the alcohol had been converted to olefin. Analysis of the water product indicated the presence of an amount of hydrogen chloride substantially equivalent to that which could be formed by the hydrolysis of the titanium dichloride acetate.

In a comparison run employing toluenesulfonic acid as a catalyst, about three hours are required to conduct the esterification, and the resulting ester has a darker color and higher concentration of unreacted fatty acid, and the recovered alcohol contains more olefin than when titanium dichloride diacetate is employed. Because of the advantages of promoting more complete esterification more selectively (that is, with less olefin formation) and more rapidly, titanium dichloride diacetate is a superior catalyst for esterification reactions.

*Example II*

In a glass flask of an esterification still, 37 g. (0.25 mol) of phthalic anhydride and 84.5 g. (0.65 mol or 30% excess or 19.5 g. excess) of 2-ethylhexanol were heated with 0.25 g. of titanium dichloride diacetate, with results as indicated.

| Mins. after mixing hot reactants | ° F. | Ml. $H_2O$ |
| --- | --- | --- |
| 5 | 400 | 1.3 |
| 10 | 415 | 2.3 |
| 15 | 425 | 3.3 |
| 20 | 435 | 3.8 |
| 25 | 448 | 4.1 |
| 30 | 448 | 4.3 |
| 40 | 450 | 4.4 |
| 50 | 450 | 4.5 |
| 60 | 450 | 4.5 |
| 75 | 450 | 4.5 |
| 90 | 450 | 4.5 |

The water formed by the esterification reaction slowly reacted with the titanium dichloride diacetate to form hydrogen chloride and a gelatinous product comprising titania derivatives. The hydrogen chloride and acetic acid were predominantly volatilized and distilled from the reaction zone with the water.

After the completion of the reaction, the gelatinous titania was separated by filtration, thereby freeing the product so completely of the catalyst that the material was steam distilled without bringing about a troublesome amount of hydrolysis of the ester. By such steam distillation, 18 g. of unreacted alcohol were recovered. The ester was water white, and had an acid number of 0.10. The concentration of unreacted phthalic acid was only 0.013%. Only 0.04% of the alcohol was dehydrated to the olefin. The ester yield was 98.3%. Such results in the preparation of a dioctyl phthalate constitute evidence that titanium dichloride diacetate is a superior esterification catalyst.

*Example III*

A larger batch of di(2-ethylhexyl) phthalate was prepared by heating a mixture of 0.184 g. (0.09% of the ester) of titanium dichloride diacetate with 74 g. (0.5 mol) of phthalic anhydride and 169 (1.3 mol) of 2-ethylhexanol, during which the temperature pattern was noted as follows:

| Minutes | Pot. temp., ° F. | Ml. $H_2O$ |
| --- | --- | --- |
| 5 | 394 | 1.3 |
| 10 | 399 | 2.6 |
| 15 | 407 | 3.8 |
| 20 | 412 | 4.6 |
| 25 | 416 | 5.4 |
| 30 | 420 | 6.3 |
| 45 | 438 | 8.3 |
| 60 | 450 | 9.0 |
| 75 | 450 | 9.1 |
| 90 | 452 | 9.1 |
| 105 | 450 | 9.1 |

The product was immediately and without filtration steam distilled to recover 37.1 g. of 2-ethylhexanol. After filtration, the analysis of the water-white ester showed an acid number of 0.045, equivalent to the presence of 0.0058% phthalic acid. Only 0.006% of the alcohol was converted to olefin. Thus, the advantages of titanium dichloride diacetate as an esterification catalyst are shown to include high selectivity and high activity, whereby the ester groups are formed rapidly in the presence of only a small amount of the catalytic salt.

*Example IV*

A polyester is prepared by heating a mixture of 4 mols of adipic acid and 6 mols of propylene glycol while agitating the reaction mixture. Titanium dichloride diacetate is added in small amounts at 5 minute intervals, approximately 0.02% by weight of the expected polyester being added 10 times for a total of 0.2% by weight of the catalyst. The reaction mixture is heated to 400° F. during about 60 minutes and is maintained at about 400° F. at a partial vacuum at about 0.5 atmospheres for about 30 minutes to complete the preparation of the polyester. The trace amounts of titanium dioxide residue particles dispersed throughout the ester do not impair the usefulness of the polyester for most of its potential uses.

*Example V*

A dicarboxylic acid is prepared by dimerizing oleic acid, and esterification is conducted by causing 4 mols of such dimer acid to react with 1 mol of glycerol and 5 mols of ethylene glycol. The reaction mixture initially contains 0.01% by weight of titanium dichloride diacetate, and additional similar amounts of the catalyst salt are added 9 times during the heating of the reaction mixture to 410° F., after which the reaction mixture is heated for 2 hours at the elevated temperature. The resulting polyester possesses a relatively light color and is suitable for the preparation of polyurethane compositions by reason of the presence of unreacted hydroxyl groups.

Obviously many modifications and variations of the invention as hereinbefore set forth may be made without departing from the spirit and scope thereof, and therefore only such limitations should be imposed as are indicated in the appended claims.

The invention claimed is:

1. In the method in which an organic compound having a carboxylic group is reacted with an organic compound having an alcoholic hydroxyl group to form a product comprising an ester group, the improvement which comprises conducting the esterification reaction in the presence of catalytic amounts of titanium dichloride diacetate.

2. The esterification method which includes the steps of heating a reaction mixture consisting essentially of an alcohol and a carboxylic acid in the presence of catalytic amounts of titanium dichloride diacetate.

3. The method of claim 2 in which the concentration of the titanium dichloride diacetate is within the range from 0.001% to 1% by weight of the ester.

4. The method of conducting the esterification of a batch of a reaction mixture containing organic compositions in which carboxylic groups and alcoholic hydroxyl groups are the principal reactants which consist of incorporating from about 0.001 to about 1% by weight of titanium dichloride diacetate in the reaction mixture, heating the reaction mixture to a temperature above 100° C. at a pressure at which water is distilled from the reaction mixture, whereby the titanium dichloride diacetate and its decomposition products catalyze the esterification reaction, and whereby the water formed by the esterification reaction brings about at least a partial hydrolysis of the titanium dichloride diacetate to form hydrogen chloride and acetic acid, whereby the hydrogen chloride and acetic acid are distilled from the reaction mixture together with the water, and whereby the ester product is more completely esterified with less discoloration than in esterification reactions catalyzed by inorganic acids.

5. The esterification method which includes the steps of heating a reaction mixture consisting essentially of an alcohol selected from the group consisting of ethylhexanol propylene glycol and ethylene glycol and a carboxylic acid selected from the group consisting of oleic acid, phthalic acid, adipic acid and the product resulting from dimerizing oleic acid, which esterification method is conducted in the presence of catalytic amounts of titanium dichloride diacetate.

No references cited.